United States Patent
Fiedler

[15] 3,649,903
[45] Mar. 14, 1972

[54] BRUSHLESS DIRECT-CURRENT WELDING GENERATOR

[72] Inventor: Gustav Fiedler, Neu-Isenburg, Germany
[73] Assignee: A.van Kaick "AvK"-Generatoren-u. Motoren-Werke oHG, Frankfurt/Main, Germany
[22] Filed: Feb. 18, 1970
[21] Appl. No.: 12,277

[52] U.S. Cl. ............................ 322/27, 219/133, 322/63, 322/73, 322/84, 322/88, 322/90
[51] Int. Cl. .............................................. H02p 9/30
[58] Field of Search .................. 322/27, 59, 60, 63, 73, 80, 322/83, 84, 86, 88, 90; 219/133

[56] References Cited

UNITED STATES PATENTS

| | | | |
|---|---|---|---|
| 3,059,168 | 10/1962 | Sones et al. | 322/59 |
| 3,316,479 | 4/1967 | Frierdich | 322/27 X |
| 3,435,325 | 3/1969 | Laudel, Jr. | 322/63 X |
| 3,463,998 | 8/1969 | Smith et al. | 322/83 X |

Primary Examiner—Lewis H. Myers
Assistant Examiner—H. Huberfeld
Attorney—Karl F. Ross

[57] ABSTRACT

A brushless direct-current generator for welding operation has a rotatable unit which includes an exciter rotor with a three-phase first winding, a main rotor with a single-phase second winding and a rectifier for energizing the latter winding from the exciter rotor; a main stator, having a three-phase third winding juxtaposed with the winding of the main rotor, feeds a load circuit through a further rectifier and also energizes the primary winding of a feedback transformer in series with one of its own phase windings. A fourth winding, forming part of an exciter stator juxtaposed with the corresponding rotor, is split into two sections; one section is in series with an extraneous DC source (battery) and an adjustable control resistor, the other being connected across the secondary of the feedback transformer. In one embodiment, the control resistor is shunted by a transistor with Zener-stabilized input connections to the load circuit for blocking the transistor in response to the flow of welding current so as to reduce the flow of battery current during a welding operation.

10 Claims, 3 Drawing Figures

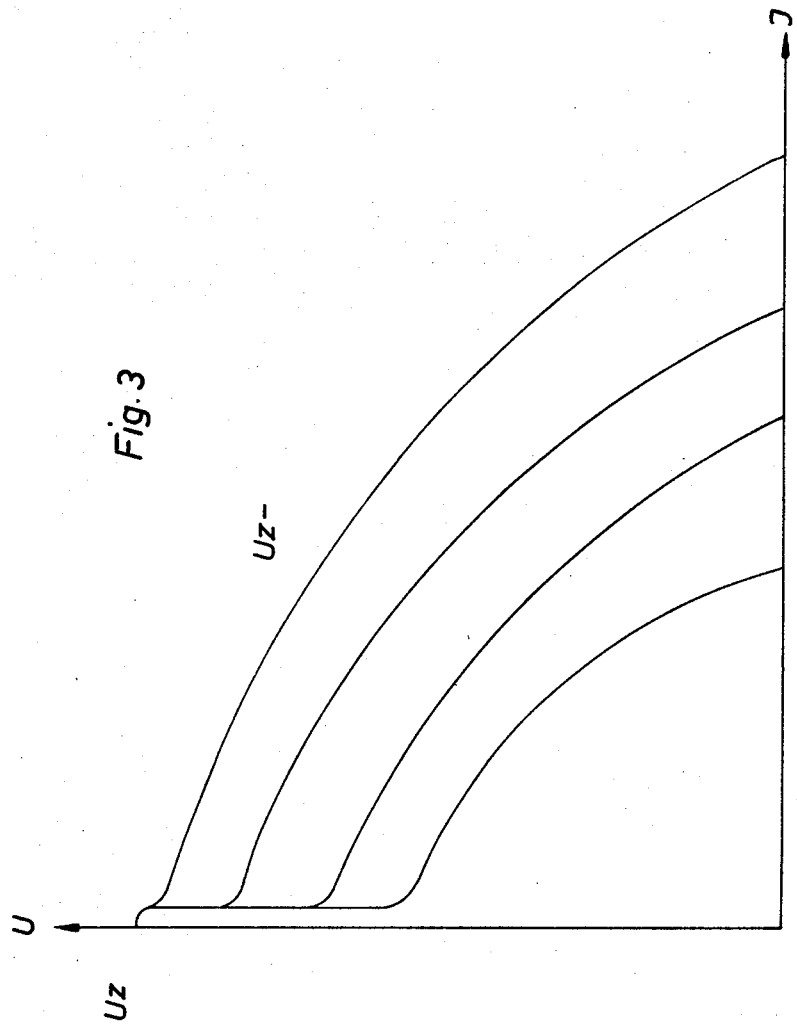

BRUSHLESS DIRECT-CURRENT WELDING GENERATOR

The invention relates to a brushless direct-current welding generator. Known generators of this type and purpose comprise a rotor with permanent-magnet poles, and three-phase current windings located on a stator, the windings being connected to a three-phase rectifier bridge circuit which produces rectified welding current. The output of such known weld generators is difficult to regulate owing to their permanent-magnet excitation; a regulator may use structurally complicated airgap chokes or, where high currents are involved, pre-magnetized direct-current chokes operating at great losses and difficult to manufacture may be necessary. Controllability from a remote position, as from a welding site, is therefore practically excluded, or possible only with considerable operational involvement.

It is an object of the present invention to provide a direct-current welding generator which has a simple and small control unit, and which affords control of the welding current from a remote point. An extraneously excited three-phase main generator is provided to produce the welding current. The excitation of this welding generator is effected by means of a three-phase exciter-current generator having a three-phase rotor revolving with the driving shaft of the main or welding current generator. A rectifier also revolves with the driving shaft of the welding-current generator and is connected in series with the rotor of the latter generator.

The development of a direct-current welding generator in accordance with the invention provides an absolutely brushless structure without permanent magnets whereby extraneous excitation of both the welding generator and the exciter-current generator is possible. In the simplest terms, the welding current is controlled by the current induced in the rotor of the exciter generator. Complex control devices are not required, and because the control currents are small in magnitude it is possible to control a large generator from a remote point substantially without power loss.

The welding-current generator is controlled by means of the excitor generator. The stator winding of the excitor generator is divided electrically into two parts. One part of this winding is connected to the variably controlled extraneous excitation which is fed by means of a voltage source, such as a battery, whereas the other part of the winding receives a variable excitation which is dependent upon the value of the welding current. This division may concern, the number of poles, or the overall number of windings. With a division ratio of 3:1, two of eight magnet poles may be associated with one winding while the remaining six magnet poles cooperate with the other winding; alternatively, 75 percent of the magnet poles may be associated with the windings of one circuit, the remaining 25 percent serving the windings of the other circuit.

Generally it will suffice to use one or two poles of an excitor generator having six or more poles to compound the excitation in dependence upon the welding current. A transformer is provided in one current path of the welding-current generator to energize the compounding winding. The three-phases of the welding-current generator are balanced and thus the transformer has a current proportional to the welding current induced in its secondary winding. This secondary winding is connected via a rectifier to the compounding winding. Thus, with suitable dimensioning the proportion of welding current supplying the excitation of the compounding winding will not vary over the entire set range of adjusting. The welding current may be regulated over wide limits, such as between 80 and 200 amps, solely by means of the battery-fed extraneous exciter winding. Adjustment in this case is effected by means of a variable resistor. The extraneous exciter current may be kept very low, thanks to the amplification available in the exciter generator, and therefore the resistance required for regulation thereof may be low and can be used to control the welding current from a remote welding site.

The present invention ensures a good dynamic behavior of the welding generator. After the setting of the welding current by means of the remote-control device, arc-voltage changes due to changes in the electrode spacing are directly compensated by the compounding winding. As the weld electrodes approach the article to be welded the resistance is reduced, and when the electrodes are applied a short circuit occurs and thus the arc voltage collapses. At this time a proportional increase in the current occurs and is transmitted via the transformer to the compounding winding. The excitation from the excitor generator is thus increased and the same acts upon the welding-current generator; the arc voltage is thus restored and maintained at a suitable level. The control of the arc voltage is accomplished electrically and thus there is a minimum time delay.

To obtain a constant high ignition voltage independent of the value of the arc voltage, as is required in certain welding machines, it is expedient to provide a transistorized control. For this purpose I provide a transistor connected in parallel with the setting resistor. The emitter of the transistor is connected via a rectifier to a transformer located in the current path of the welding generator and via a Zener diode and a shunt resistor to an extraneous voltage source. Thus, when the welding generator is idling, the transistor shorts out the setting resistor, and when the welding-current generator is loaded, the transistor is cut off.

It is possible, with the present invention, to provide an auxiliary voltage source for driving ancillary apparatus. An auxiliary winding is located in the slots of the main stator assembly of the welding-current generator and is set to the required terminal voltage by selection of the number of turns per winding. The auxiliary winding may produce alternating or three-phase current when the welding operation is suspended to energize, for example, equipment performing subsequent or preliminary operations. During operation of the auxiliary winding the generator is controlled in the same manner as during welding via the compounding winding, for which purpose it is merely necessary to superpose a second primary winding, fed from the auxiliary circuit, onto the current transformer of the compounding circuit. Thus the current in the auxiliary winding is controlled similar to the welding current. The current induced in the auxiliary winding via the transformer is subject to the influence of the additional primary winding, is rectified in the rectifier of the compounding circuit and thus acts on the compounding winding of the excitor generator.

A preferred embodiment of the invention will be hereinafter described with reference to the accompanying drawing in which:

FIG. 3 is a current-voltage graph for the welding generator of FIG. 2.

Figure 1:
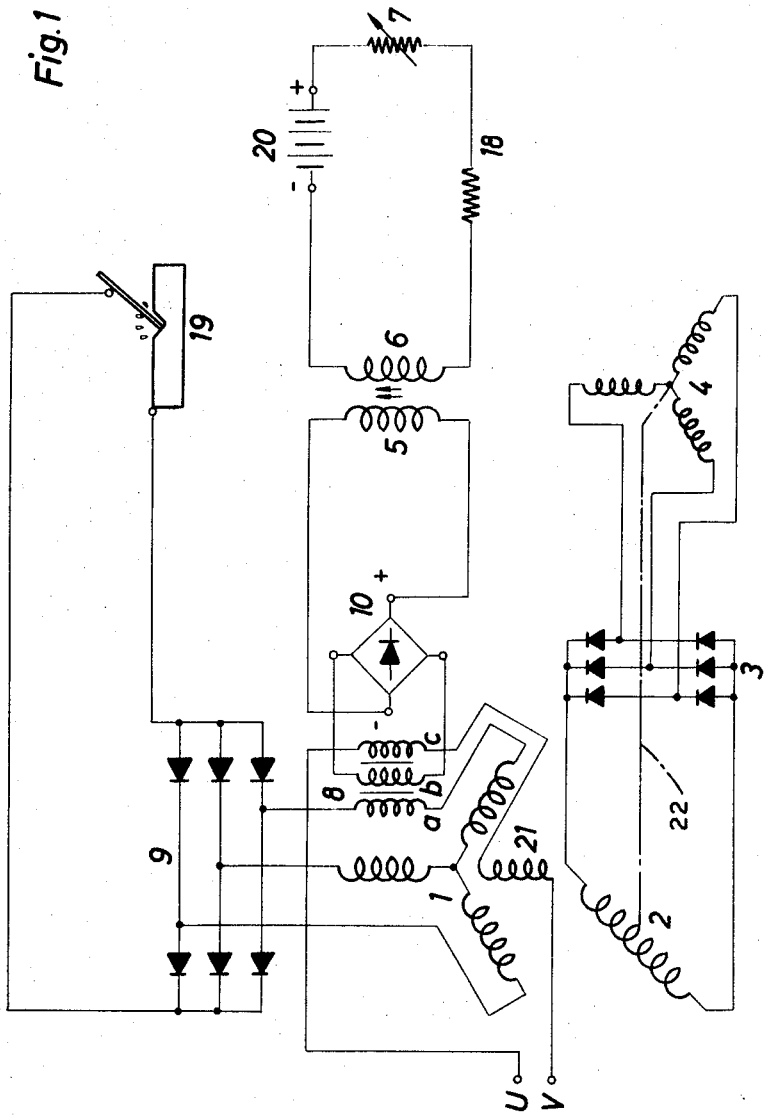
FIG. 1 is a circuit diagram for a brushless direct-current welding generator in accordance with the invention.

In the drawing numeral 1 denotes the three-phase stator winding of a brushless three-phase generator which supplies a rectified welding current to a welding apparatus 19 via a load circuit including a three-phase rectifier bridge 9. Numeral 2 denotes the rotor of the welding-current generator, which is extraneously excited. For this purpose a three-phase excitor generator is provided, comprising a stator winding 5/6 and a three-phase rotor 4, which is mounted on the driving shaft 22 (indicated diagrammatically) of the welding-current generator 1/2. A three-phase rectifier 3 which also rotates with the driving shaft of the welding-current generator, is connected to the three phase windings of exciter rotor 4, its three branches working in parallel into the single-phase winding of main rotor 2. Hence the welding current generator 1/2 is easily controlled by the excitor generator 4/5/6.

The stator winding of the excitor generator is electrically divided in two parts. One part 6 of the winding is connected into an extraneous excitation circuit. The power for this circuit is derived from an extraneous voltage source 20, such as a battery or the DC supply for the ignition system of the internal-combustion engine driving the main generator. The other part 5 of the stator winding is a compounding winding which carries a current proportional to the welding current. The two winding sections 5,6 are arranged in aiding relationship, as indicated by the arrows. It is immaterial whether the winding is divided into two by dividing the excitor poles or by dividing the total number of windings thereon.

The compounding stator winding 5 is excited by a current transformer 8, the primary winding $a$ of which is in series with one phase of the welding generator; the secondary winding $b$ is connected via a feedback path including a rectifier 10 to the compounding or regenerative winding 5 of the excitor generator. The regulation thus afforded by compounding is effective over a welding-current range of 80 to 200 amps. The extraneous excitor circuit is controlled by a variable potentiometer 7, such as a rotary or sliding resistor.

In the embodiment shown in FIG. 1, a single-phase or three-phase auxiliary winding 21 is provided which is located in the slots of the main stator assembly of the three-phase current winding 1 of the welding generator to develop, across terminals U,V, an depending on the number of turns per winding. By means of this auxiliary winding, when no welding is in progress, an alternating or three-phase current may be produced to drive ancillary devices, such as the devices for carrying out preliminary or subsequent operations. The generator is normally designed for the conventional mains frequency (50 or 60 Hz.) but may be designed to work at any other frequency-between 50 and 400 Hz., so that frequency dependent ancillary devices can be used. During auxiliary operation the generator is controlled in the same manner as in welding, for which purpose the transformer 8 has a second primary winding $c$ fed from the auxiliary circuit.

The apparatus shown in FIG. 1 operates as follows:

After starting the driving motor, the first winding 4 in the exciter rotor, the rectifier 3 and the second winding 2 in the main rotor are rotated simultaneously. The voltage source 20 is connected to the stator winding 6 which is thus excited and hence a three-phase current is produced in the third winding 1. This adjustment of the resistor 7 in the control circuit for winding section 6 sets the exciter current and hence also the welding current at the required value. The three-phase voltage induced in the three-phase winding 1, after rectification by the rectifier 9, builds up a direct voltage across the welding electrodes of the welding device 19. When the welding electrodes encounter the article being welded, the resistance progressively diminishes until the voltage collapses by reason of the short circuit produced when the electrodes are applied to the workpiece. As a consequence of this a high current flows in the welding circuit and a voltage is induced in the transformer, which on rectification by the rectifier 10 generates a current in the feedback section 5 of the fourth winding 5,6 and so causes excitation of the exciter generator 6/4 and thus a higher an intensification of the welding current from main generator 1/2. Similarly, the compounding circuit 8/10/5 also acts to maintain the required arc voltage when the welding resistance varies with changes in of the electrode spacing.

The auxiliary winding 21, in series with a third transformer winding $c$ acting as a second primary, operates in a similar manner, both systems being operable alternately but not simultaneously as otherwise cross-compounding would result.

Figure 2:
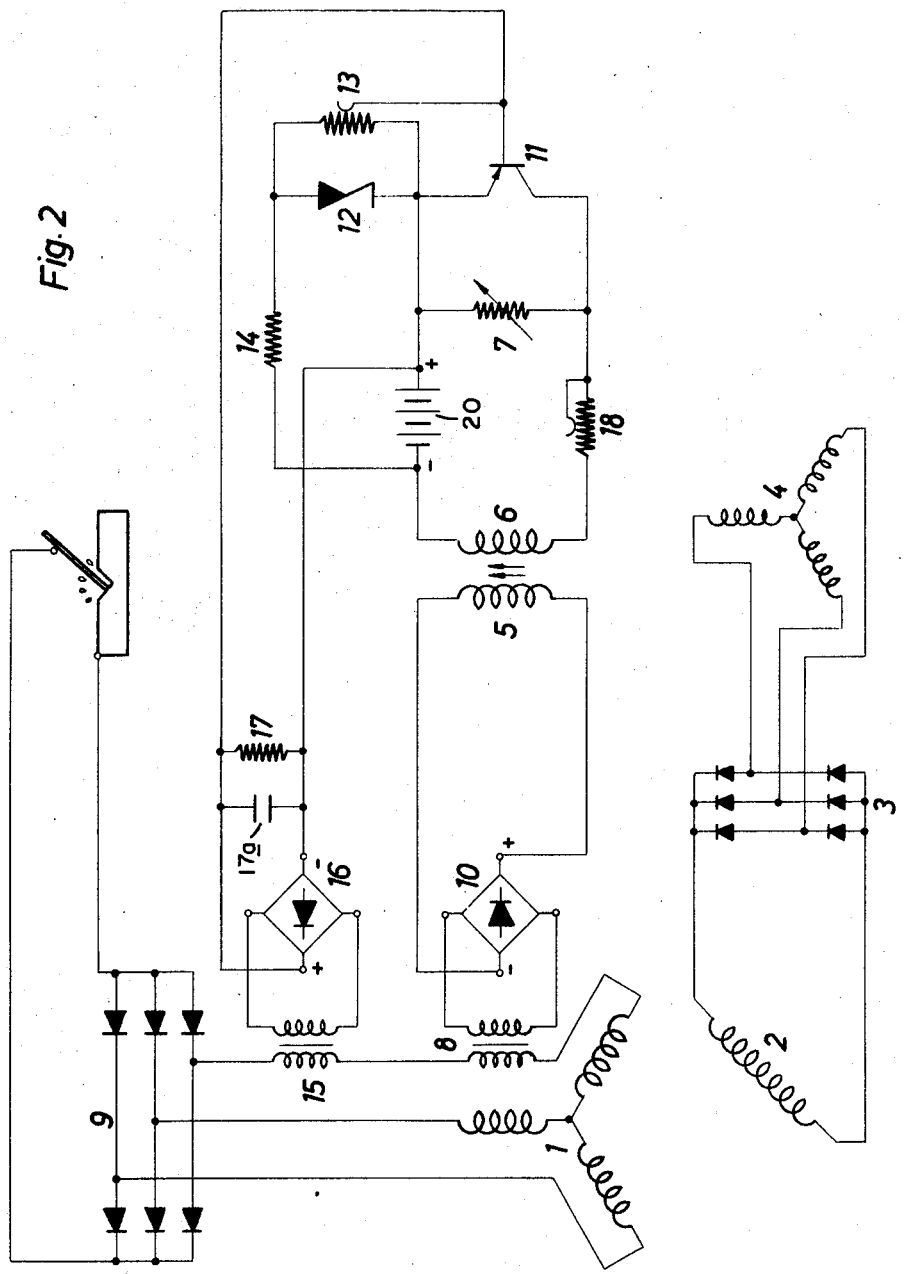
FIG. 2 is a welding generator controlled by a constant firing voltage.

In the case of FIG. 2, a substantially identical welding generator is shown but without any auxiliary windings. A transistor control is provided to obtain a constant high igniting voltage independent of the value of the arc voltage. A transistor 11 is connected in parallel with the variable resistor 7. The emitter of the transistor 11 is connected via a rectifier 16 to the secondary winding of a transformer 15 located in the current path of the welding-current generator, and additionally via a Zener diode 12 and a biasing resistor 13, connected in parallel, to the extraneous voltage source 20. Thus when the welding-current generator is idling, the transistor shunts the variable resistor 7, and when welding current, flows, the transistor is blocked. The numeral 17 denotes an inductance shunted by and a capacitance 17$a$.

During idling, i.e., when the welding operation is interrupted, direct current stabilized by the Zener diode 12 is supplied from the extraneous voltage source 20 to the base of the transistor 11 via the resistor 13. This direct current renders the transistor 11 conductive, thus short-circuiting the variable resistor 7. The resistor 7 is therefore out of action, so that the welding generator is excited with an igniting voltage adjustable by the resistor 18 here shown to be variable. Once ignition has occurred and welding current flows, the current induced in the transformer 15 and rectified in the rectifier 16 balances the base current and blocks of the transistor 11, rendering the variable resistor 7 effective. The excitation is thus adjusted to the given value set by this resistor, so that the generator operates on the static characteristic selected by adjustment of the variable resistor 7. When current is interrupted the variable resistor 7 is again shorted and the excitation of the exciter generator returns to the ignition voltage value set by the resistor 18.

FIG. 3 shows a current-voltage diagram. It shows four static characteristics each individually set by the resistor 7. These characteristics merge in the region $I \rightarrow 0$ because the resistor 7 is shorted by the transistor 11. At $I = 0$ the maximum ignition voltage Uz is attained. This value is preset by adjustment of the resistor 18.

In operation, the electrode voltage U drops to a value Uz whose magnitude depends on the setting of resistor 7 as well as, of course, the nature of the workpiece.

I claim:

1. A brushless direct-current welding generator comprising a three-phase stator winding, a first three-phase rectifier connected in series therewith to produce rectified welding current, an electromagnetic rotor and a driving shaft therefor, an exciter generator with a three phase rotor mounted on said driving shaft, a second three-phase rectifier also mounted on said driving shaft in series with said three-phase rotor, said second three-phase rectifier being connected to said electromagnetic rotor, a winding electrically divided into two parts acting as the stator of said exciter generator, a variably controlled extraneous excitation circuit connected to one part of said divided winding, the other part of said divided winding acting as a compounding winding and carrying a current dependent upon the welding current, a setting resistor connected in said extraneous excitation circuit, a transistor connected in parallel with said setting resistor, a transformer having primary and secondary windings, said primary winding being connected in one current path of said welding generator, a first rectifier connected to said compounding winding of said exciter generator and to a secondary winding of said transformer, a second rectifier connected to the secondary winding of said transformer and to said transistor, said transistor also being so connected to said extraneous excitation circuit that when said welding generator is idling said transistor shorts out said setting resistor and when the welding current generator is operating said transistor is suppressed.

2. A welding generator as recited in claim 1, further comprising an auxiliary winding of predetermined voltage output located in the winding slots of said welding generator, whereby when the welding current generator is not operational an alternating or three-phase current can be drawn from said auxiliary winding.

3. A welding generator as recited in claim 1, further comprising a second primary winding associated with said transformer and connected to said auxiliary winding.

4. A brushless direct-current welding generator comprising:
a rotatable unit including an exciter rotor with first winding means, a main rotor with second winding means and rectifier means forming part of an energizing circuit for said second winding means connected across said first winding means;
a main stator including third winding means juxtaposed with said second winding means for generating an output voltage;

an exciter stator including fourth winding means juxtaposed with said first winding means for inducing therein an energizing circuit for said second winding means upon rotation of said unit, said fourth winding means being split into two winding sections in aiding relationship;

a load circuit connected across said third winding means and including a welding electrode energizable by said output voltage for passing a welding current through a workpiece inserted in said load circuit;

a control circuit for one of said winding sections including a source of extraneous direct current for the energization thereof and variable resistance means in series with said source for adjusting the magnitude of said output voltage prior to flow of said welding current; and a feedback circuit including transformer means with a primary winding connected in series with said third winding means for traversal by at least part of said welding current and with a secondary winding connected in a rectifying path across the other of said winding sections for supplementing the exciter current from said source upon the flow of welding current, thereby intensifying the latter.

5. A welding generator as defined in claim 4 wherein said variable resistance means includes a resistor in series with said one of said winding sections and a transistor shunting said resistor, said transistor having input connections to said load circuit for being driven to cutoff in response to the flow of welding current.

6. A welding generator as defined in claim 5, further comprising a biasing circuit for said transistor including a stabilizing Zener diode.

7. A welding generator as defined in claim 4 wherein said first and third winding means consist each of three phase windings, said primary winding lying in series with one of the phase windings of said third winding means.

8. A welding generator as defined in claim 7, further comprising an auxiliary winding on said main stator for generating an ancillary voltage, said transformer having a further winding connected in series with said auxiliary winding.

9. A welding generator as defined in claim 7, further comprising three-phase rectifier means connected in said load circuit.

10. A brushless direct-current welding generator comprising:

a rotatable unit including an exciter rotor with first winding means, a main rotor with second winding means and rectifier means forming part of an energizing circuit for said second winding means connected across said first winding means;

a main stator including third winding means juxtaposed with said second winding means for generating a welding current in a load circuit connected thereacross, said first and third winding means consisting each of three phase windings;

an exciter stator including fourth winding means juxtaposed with said first winding means for inducing therein an energizing circuit for said second winding means upon rotation of said unit, said fourth winding means being split into two winding sections in aiding relationship;

a control circuit for one of said winding sections including a source of extraneous direct current for the energization thereof;

a feedback circuit including transformer means with a primary winding connected in series with one of the phase windings of said third winding means for traversal by at least part of said welding current and with a secondary winding connected in a rectifying path across the other of said winding sections for supplementing the exciter current from said source upon the flow of welding current, thereby intensifying the latter; and an auxiliary winding on said main stator for generating an ancillary voltage, said transformer having a further winding connected in series with said auxiliary winding.

* * * * *